US004001694B2

United States Statutory Invention Registration [19]

[11] Reg. Number: H1694

McCann

[45] Published: Nov. 4, 1997

[54] REPLACEABLE CONNECTOR TIP

[76] Inventor: John C. McCann, 4034 Agua Dulce Blvd., La Mesa, Calif. 91941

[21] Appl. No.: 569,415

[22] Filed: Dec. 6, 1995

[51] Int. Cl.[6] ..... H01R 13/00

[52] U.S. Cl. ..... 439/651

[58] Field of Search ..... 439/651

[56] References Cited

U.S. PATENT DOCUMENTS

| | | | |
|---|---|---|---|
| 3,093,432 | 6/1963 | King | 439/606 |
| 4,005,922 | 2/1977 | Burkhart et al. . | |
| 4,402,566 | 9/1983 | Powell et al. . | |
| 4,422,710 | 12/1983 | Perona . | |
| 4,653,839 | 3/1987 | Powell . | |
| 4,808,115 | 2/1989 | Norton et al. | 439/79 |
| 4,954,105 | 9/1990 | Fischer | 439/864 |
| 5,022,865 | 6/1991 | Wright et al. | 439/279 |
| 5,064,389 | 11/1991 | Klein et al. | 439/651 |
| 5,120,245 | 6/1992 | Robertson et al. | 439/395 |
| 5,211,590 | 5/1993 | Smith et al. | 439/894 |
| 5,380,224 | 1/1995 | DiCicco | 439/610 |
| 5,439,391 | 8/1995 | McEtchin et al. | 439/518 |
| 5,439,392 | 8/1995 | Rouhier et al. | 439/559 |

*Primary Examiner*—Michael J. Carone
*Assistant Examiner*—Theresa M. Wesson

[57] ABSTRACT

A replaceable connector of the present invention comprises an array of connector pins in a parallel alignment each having a female end and a male end. The connector pins are fixed in a molded connector body that exposes the female ends and forms a hollow pin receptacle around each of the male ends.

6 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REPLACEABLE CONNECTOR TIP

BACKGROUND OF THE INVENTION

The present invention relates to electronic cable connectors. More specifically, but without limitation thereto, the present invention relates to a replaceable connector tip for flat cable assemblies.

Flat cable assemblies with molded connector pins are typically replaced at considerable expense when the pins are damaged because the pins are non-replaceable. Unlike semi-permanent cable installations, test cables are manually mated and disconnected from their receptacles many times and consequently are more frequently damaged. Miniature, hollow pin connectors are particularly vulnerable to damage in a test environment.

A need therefore exists for a pin connector replacement for flat cable assemblies that may be readily installed in the field.

SUMMARY OF THE INVENTION

A replaceable connector of the present invention is directed to overcoming the problems described above, and may provide further related advantages. No embodiment of the present invention described herein should be construed to preclude other embodiments or advantages that may exist or become obvious to those skilled in the art.

A replaceable connector of the present invention comprises an array of connector pins in a parallel alignment each having a female end and a male end. The connector pins are fixed in a molded connector body that exposes the female ends and forms a receptacle around each of the male ends.

An advantage of the replaceable connector of the present invention is that expensive cable assemblies may readily be repaired in the field without special tools.

Another advantage is that the replaceable connector reduces the cost of repairing cable assemblies with damaged pins.

The features and advantages summarized above in addition to other aspects of the present invention will become more apparent from the description accompanied by the following drawings.

DESCRIPTION OF THE INVENTION

The following description is presented solely for the purpose of disclosing how the present invention may be made and used. The scope of the invention is defined by the claims.

Figure 1:
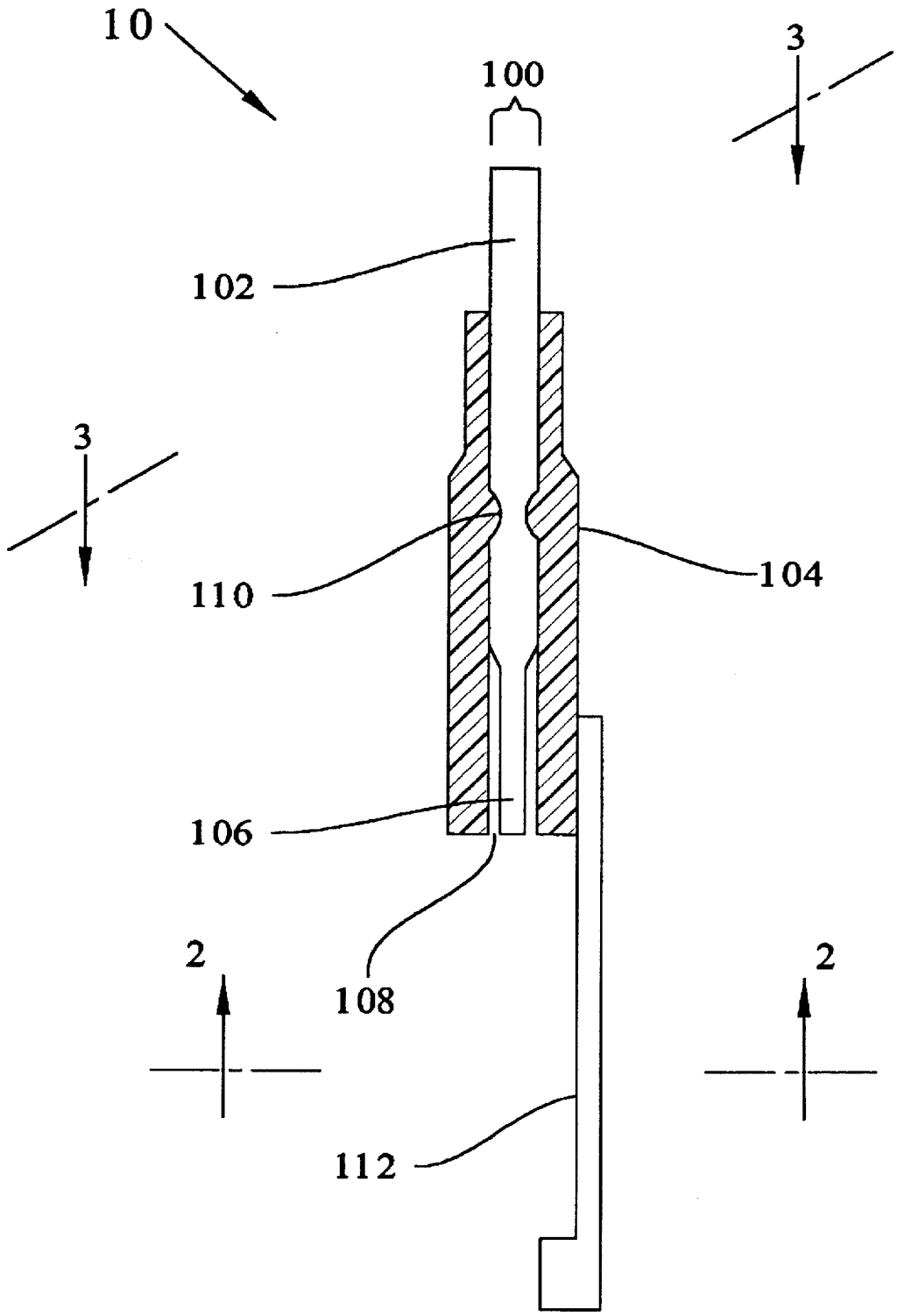
FIG. 1 is a side view cross-section of a replaceable connector of the present invention.

In the side view cross-section of FIG. 1, replaceable connector 10 comprises a connector pin 100 and a molded connector body 104. One end of connector pin 100 is formed into a female end 102. The other end of connector pin 100 is formed into a male end 106. Connector pin 100 is fixed in a molded connector body 104 that exposes female end 102 and forms a receptacle 108 around male end 106. A crimp 110 prevents connector pin 100 from being displaced from connector body 104. A retainer clip 112 may be added for locking connector body 104 to a cable assembly.

Figure 2:
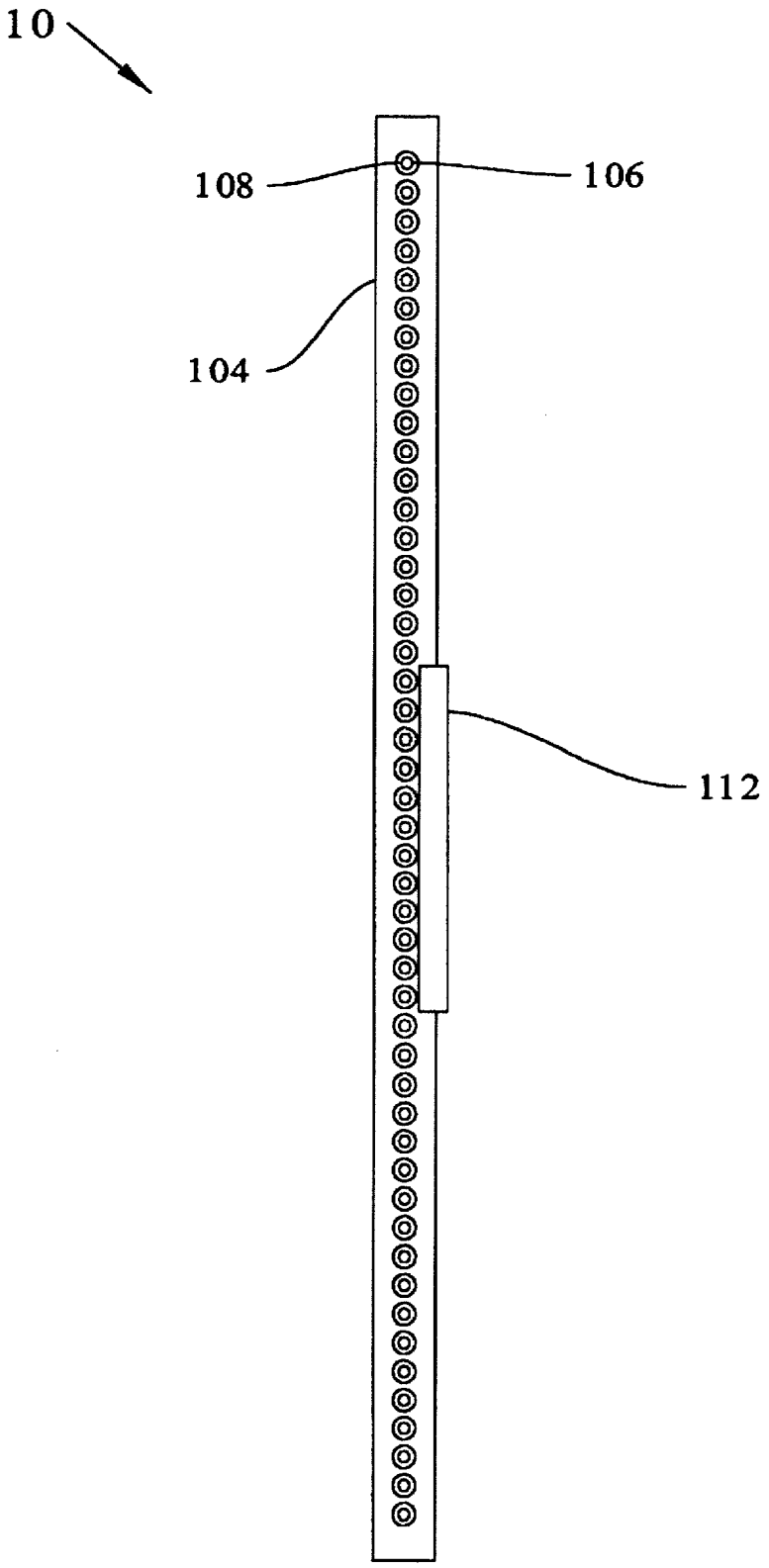
FIG. 2 is a bottom view of the replaceable connector of FIG. 1.

FIG. 2 shows replaceable connector 10 viewed from the bottom to illustrate receptacle 108 formed in connector body 104 around each connector pin 100. Connector pins 100 are fixed in a parallel alignment as shown by connector body 104.

Figure 3:
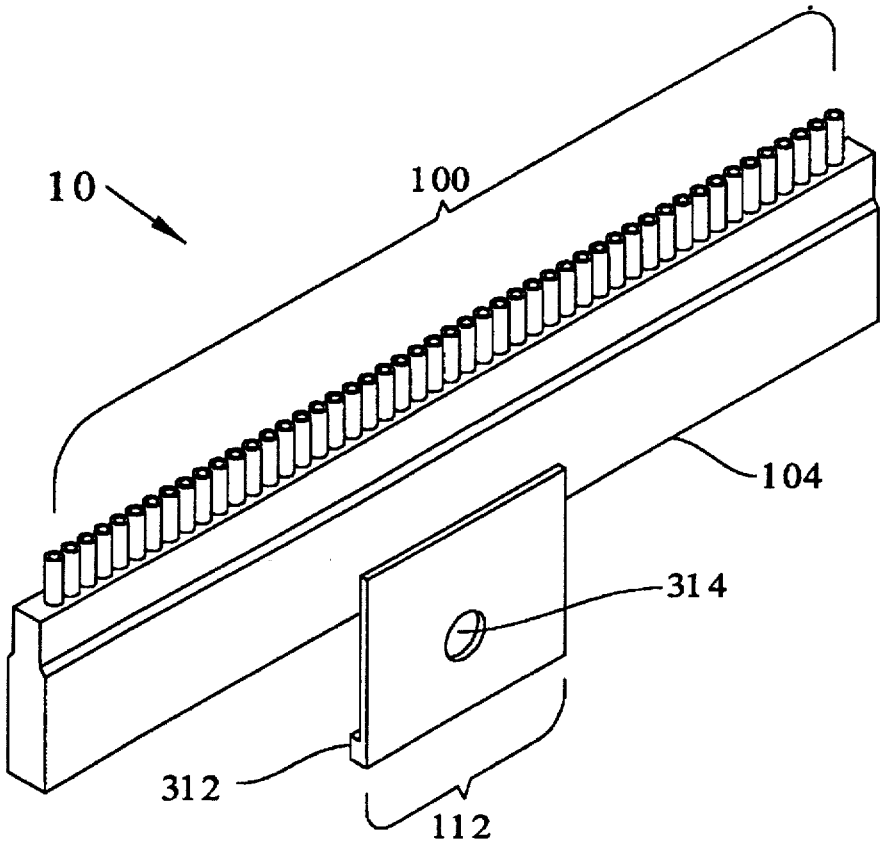
FIG. 3 is a top perspective view of the replaceable connector of FIG. 1.
Figure 4:
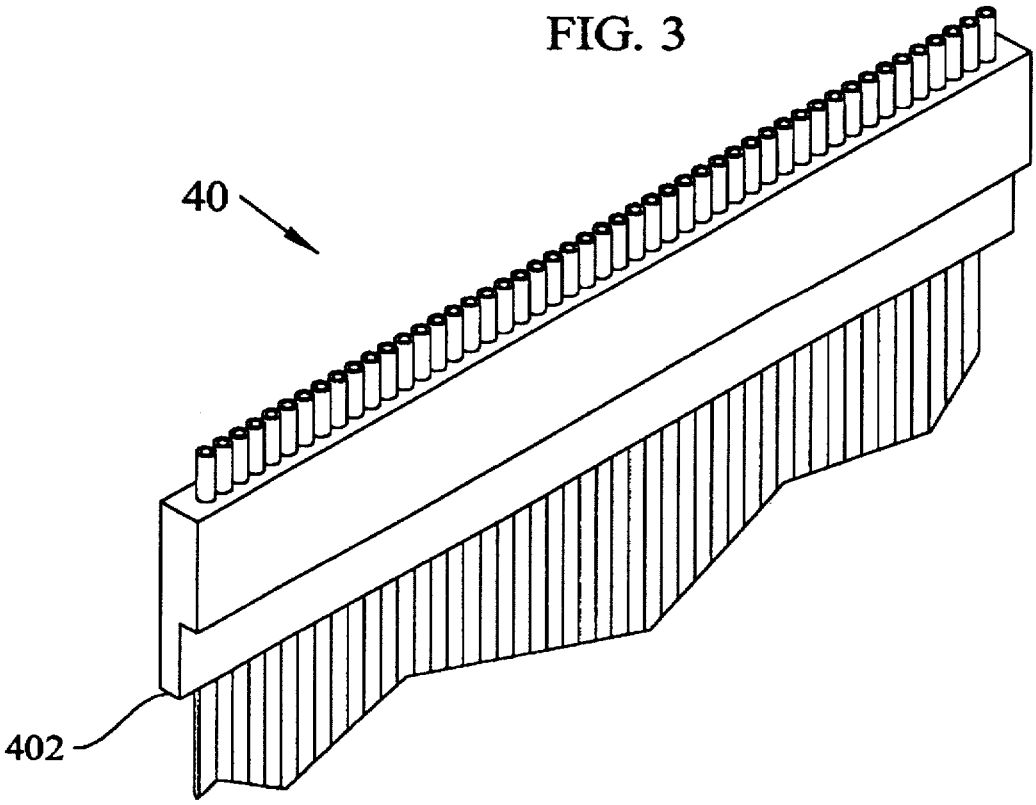
FIG. 4 is a top view of a cable assembly for mating to the replaceable connector of FIG. 3.

FIG. 3 is a top perspective view of replaceable connector 10. Retainer clip 112 locks connector body 104 by a detent 312 to a mating connector 402 of a cable assembly 40 in FIG. 4. In FIG. 3, a hole 314 may be provided for applying leverage against retainer clip 112 through hole 314 to assist in overcoming high insertion force that may be required to release connector pins 100 when replacing replaceable connector 10. Other retaining mechanisms may be used as practiced in the art. A cover piece (not shown) may be used as is well known in the art to protect connector pins 100 when connector 20 is mated to cable assembly 40 in FIG. 4 while cable assembly 40 is disconnected.

Other modifications, variations, and applications of the present invention may be made in accordance with the above teachings other than as specifically described to practice the invention within the scope of the following claims.

I claim:

1. A replaceable connector for protecting the pins of cable assemblies comprising:

an array of connector pins each having a female end and a male end; and a connector body operably coupled to said array of connector pins for maintaining said connector pins in a parallel alignment, wherein said connector body exposes each said female end and forms a receptacle around each said male end of said connector pins.

2. The replaceable connector of claim 1, further comprising a retainer clip operably coupled to said connector body for locking said connector body to a cable assembly.

3. The replaceable connector of claim 2, wherein said retainer clip comprises a detent and a release.

4. The replaceable connector of claim 1, wherein said connector pins comprise hollow pins.

5. The replaceable connector of claim 1, further comprising a flat cable assembly for operably coupling to said replaceable pin connector.

6. The replaceable connector of claim 1, further comprising a crimp in said connector pins for securing said connector pins to said connector body.

* * * * *